United States Patent [19]

Kimura

[11] Patent Number: 5,181,118
[45] Date of Patent: Jan. 19, 1993

[54] METHOD OF CORRECTING IMAGE SIGNAL

[75] Inventor: Kei Kimura, Kanagawa, Japan

[73] Assignee: Fuji Photo Film Co., Ltd., Kanagawa, Japan

[21] Appl. No.: 658,893

[22] Filed: Feb. 22, 1991

[30] Foreign Application Priority Data

Mar. 20, 1990 [JP] Japan ............................. 2-71291

[51] Int. Cl.$^5$ ............................................. H04N 3/14
[52] U.S. Cl. ........................... 358/213.16; 358/213.18; 358/213.19; 358/461
[58] Field of Search ............ 358/213.16, 213.19, 358/213.18, 461, 163, 221, 213.15; 382/50

[56] References Cited

U.S. PATENT DOCUMENTS

| | | | |
|---|---|---|---|
| 4,128,830 | 12/1978 | Weythman | 382/50 |
| 4,293,877 | 10/1981 | Tsunekawa et al. | 358/213.16 |
| 4,300,163 | 11/1981 | Wada et al. | 358/213.15 |
| 4,660,082 | 4/1987 | Tomohisa et al. | 358/163 |
| 4,771,267 | 9/1988 | Russell Jr. et al. | 382/50 |
| 4,786,969 | 11/1988 | Shouji et al. | 358/213.16 |
| 4,803,556 | 2/1989 | Beikirch | 358/228 |
| 5,038,225 | 8/1991 | Maeshina | 358/461 |
| 5,047,861 | 9/1991 | Houchin et al. | 358/213.16 |
| 5,053,873 | 10/1991 | Taniji | 358/213.16 |
| 5,086,343 | 2/1992 | Cook et al. | 358/213.15 |

FOREIGN PATENT DOCUMENTS

| | | |
|---|---|---|
| 0350328 | 1/1990 | Europe. |
| 62-202673 | 9/1987 | Japan. |
| 63-246864 | 9/1988 | Japan. |

OTHER PUBLICATIONS

Patent Abstracts of Japan, vol. 12, no. 60 (E-584), Feb. 23, 1988 (JP-A-62 202 637, Sept. 7, 1987).

*Primary Examiner*—Michael T. Razavi
*Assistant Examiner*—Steven P. Klocinski
*Attorney, Agent, or Firm*—Sughrue, Mion, Zinn, Macpeak & Seas

[57] ABSTRACT

Disclosed herein is a method of correcting an image signal, which is suitable for use in reading an image by an image sensor having a black reference pixel and effective pixels. This method comprises a first process for determining initial offset data from the black reference pixel and determining such first correction data that values outputted from all the effective pixels of the image sensor are identical to each other at the exposure greater than the minimum value of an exposure range required to read the image and smaller than the maximum value of the exposure range necessary to read the same; a second process for determining the latest offset data from the black reference pixel; a third process for determining offset correction data from the difference between the latest offset data and the initial offset data; a fourth process for determining image data from the effective pixels of the image sensor upon reading the image borne by an original; a fifth process for adding the first correction data to the offset correction data to obtain second correction data; and a sixth process for subtracting the second correction data from the image data to obtain image data subsequent to correction processing. In addition, this method includes a seventh process for performing shading correction of the image data obtained in the sixth process.

3 Claims, 5 Drawing Sheets

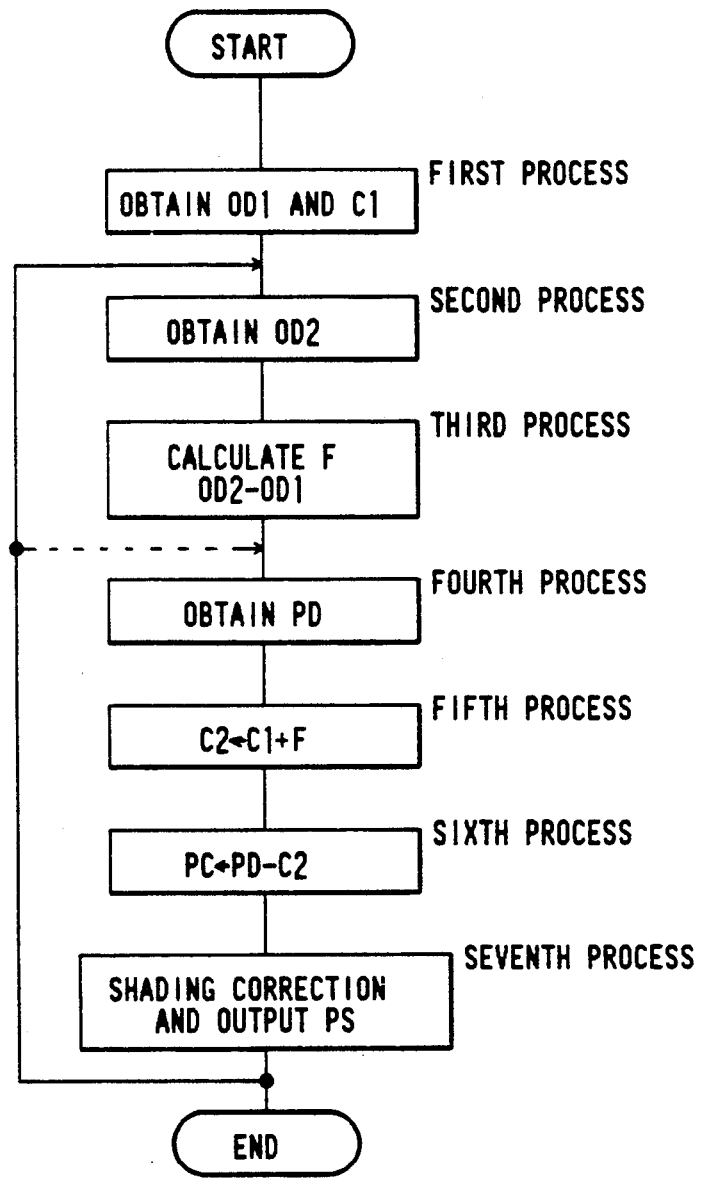

METHOD OF CORRECTING IMAGE SIGNAL

BACKGROUND OF THE INVENTION

1. Field of the Invention

The present invention relates to a method of correcting an image signal, which is suitable for use in reading an image by means of an image sensor such as a line sensor, etc..

2. Description of the Related Art

Photoelectric output characteristics of respective pixels as photoelectric converting elements of an image sensor such as a line sensor, etc. are not necessarily linear over the entire range of exposure, as indicated by symbols A, B, C in FIG. 1. In particular, photoelectric output characteristics tend to vary increasingly as exposure approaches darkness levels. In addition, there is a specific current-on-darkness flow in the respective pixels even when there is no light incident thereon. An output voltage corresponding to the current-on-darkness appears as an output-on-darkness.

A method of correcting such variations in image signal photoelectric output characteristics has been disclosed in Japanese Laid-Open Patent Publication No. 62(1987)-202673, for example. According to the disclosure, a so-called shading correction is made at a portion where exposure increases so as to cause respective photoelectric output characteristics to converge. Then, a correction is made in such a manner that the respective photoelectric output characteristics are concentrated on a zero value at the point of the output-on-darkness, i.e., at the zero point of the exposure. The resulting corrected characteristics are represented by the symbols A', B' and C' in FIG. 2. The characteristic A' in FIG. 2 will be equivalent to an ideal linear characteristic.

However, the disclosure has a drawback in that the respective photoelectric output characteristics differ from each other at the range of a low exposure close to the level-on-darkness even when such a correction is made, thereby causing stripe-like density unevenness to appear in a sub-scanning direction of an output image.

An example of a technique of solving such a drawback is disclosed in Japanese Patent Application No. 63(1988)-246864. According to this method, respective values outputted from all the effective pixels of an image sensor are set equal to each other at a minimum value of an exposure range (hereinafter called "read range") required to read an image. These output values may also be set equal to each other at an exposure value X, which is smaller than the read range as shown by symbols A", B" and C" in FIG. 3.

However, this disclosure also has a drawback in that when the read range is determined in this way, the dynamic range relative to the read range is narrowed, in other words, the difference between the minimum value and the maximum value of the read range is reduced. Also, even when the read range is extended to the low exposure range, a problem arises in that the stripe-like density unevenness is visible.

Further, the disclosure has another drawback in that since an offset value, which varies according to variations in ambient temperature, exists in an image signal outputted from pixels of an image sensor such as a line sensor, step-wise density unevenness appears in the sub-scanning direction of the output image immediately after the power supply of an image reader is turned on where the correction processing relative to the offset value is not made.

SUMMARY OF THE INVENTION

It is a major object of the present invention to provide a method of correcting an image signal wherein variation in characteristics of an image sensor at a low exposure region is corrected within an exposure range required to read an image. The variations in the offset value are corrected, thereby making it possible to achieve a wide read range free of visible stripe-like density unevenness and step-wise density unevenness produced on an output image.

It is another object of the present invention to provide a method of correcting an image signal which is suitable for use in reading an image by an image sensor having a black reference pixel and effective pixels. The method comprises a first process for determining the initial offset data from the black reference pixel and determining first correction data where the output values from all the effective pixels of the image sensor are identical to each other at an exposure level greater than the minimum value and less than the maximum value of an exposure range required to read the image; a second process for determining the latest offset data from the black reference pixel; a third process for determining offset correction data from the difference between the latest offset data and the initial offset data; a fourth process for determining image data from the effective pixels of the image sensor upon reading the image borne by an original; a fifth process for adding the first correction data to the offset correction data to obtain second correction data; and a sixth process for subtracting the second correction data from the image data to obtain image data subsequent to correction processing.

It is a further object of the present invention to provide a method further including a seventh process for performing shading correction of the image data obtained in the sixth process.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 6 is a flowchart for describing a process of operating the apparatus depicted in FIG. 4.

DETAILED DESCRIPTION OF THE PREFERRED EMBODIMENTS

Figure 4:
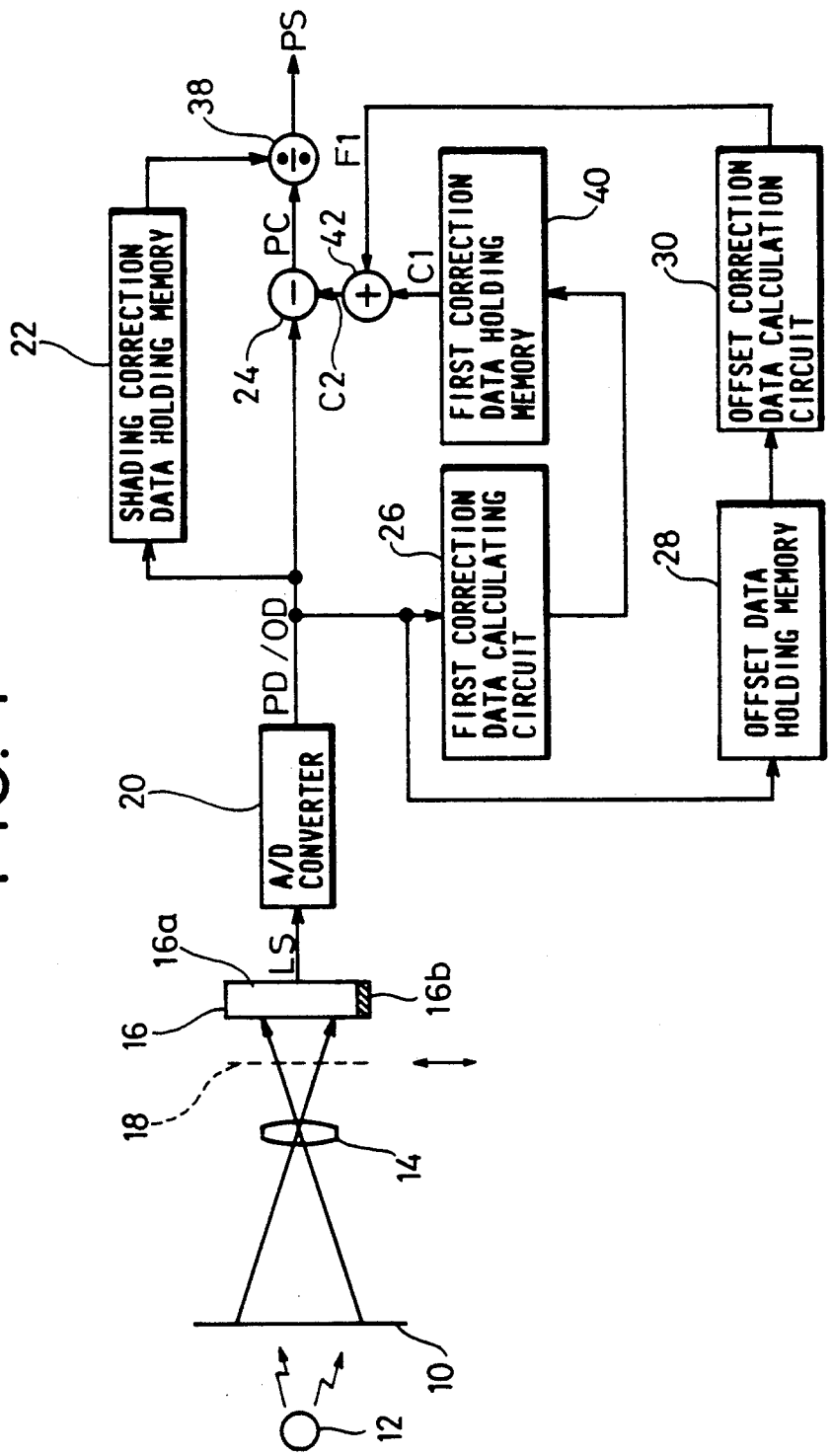
FIG. 4 is a block diagram showing one example of an apparatus for performing an image signal correcting method according to the present invention.

FIG. 4 shows one example of an image signal processing apparatus for implementing an image signal correcting method according to the present invention. An original 10, such as a color reversal film, is subjected to light emitted from a light source 12 such as a fluorescent lamp. A CCD line sensor 16 scans or senses and reads the light which passes through a lens 14. The line sensor 16 has a plurality of effective pixels 16a used to output an image signal, and a black reference pixel 16b covered with an aluminum film, said black reference pixel 16b being adapted to produce an output-signal-on-darkness (offset signal) without reaction to the light.

An ND filter 18 is provided between the lens 14 and the line sensor 16 in such a manner that it can be advanced or withdrawn in the direction indicated by the arrow. For example, when the density range required is 0 to 3.0, the exposure range required would be 1 to 1000 if the exposure of white levels is 1000. Therefore, the density of the ND filter 18 is selected in such a manner that the density range referred to above is represented by values of from 0 to 2, i.e., the exposure range is defined by values of from 1000 to 10, as indicated at the axis of abscissa in FIG. 5. This is because output values from all the effective pixels 16a of the image sensor 16 are converged at the exposure Y (see FIG. 5). In other words, the ND filter 18 is set to the density for obtaining a signal where the output values from all the pixels of the image sensor 16 are identical to each other at an exposure level greater than the minimum value and less than the maximum level of the exposure range required to read an image (see FIG. 5).

Referring to FIG. 4, an output signal from the line sensor 16 is inputted to an A/D converter 20 as a read signal LS. The output signal is converted into digital image data PD corresponding to the effective pixels 16a and digital offset data OD corresponding to the black reference pixel 16b. The image data PD is introduced into a shading correction data holding memory 22, a subtractor 24, and a first correction data calculating circuit 26, whereas the offset data OD is introduced into an offset data holding memory 28.

The shading correction data holding memory 22 contains known shading correction data corresponding to the output signal of the effective pixels 16a of the line sensor 16 in a state in which a transparent reference original, as an alternative to the original 10, is placed in position and the ND filter 18 is withdrawn from the optical path. The output of the shading correction holding memory 22 is received by divider 38.

The first correction data calculating circuit 26 calculates the difference between the output data characteristic R (see FIG. 5) as a reference and the image data PD. Data about the difference therebetween is stored in a first correction data holding memory 40 as first correction data C1 in association with pixels. The offset data holding memory 28 holds therein the offset data OD outputted from the black reference pixel 16b of the line sensor 16 at the time that the first correction data calculating circuit 26 has calculated the first correction data C1, and also stores therein offset data OD at the time that an image is read in practice. In addition, the offset data holding memory 28 is so constructed that the offset data OD outputted from the black reference pixel 16b is introduced therein for each predetermined period of time so as to make it possible to update the same successively. Thus, previously measured offset data OD1 (hereinafter called "previous offset data") and offset data OD2 measured at the most recent time (hereinafter called "latest offset data") are stored in the offset data holding memory 28 after the reading of the image has started in practice. Incidentally, the offset data holding memory 28 has two memory addresses M1 and M2 therein. The previous offset data OD1 is stored at the memory address M1, whereas the latest offset data OD2 is stored at the memory address M2. The previous offset data OD1 and the latest offset data OD2 are supplied to the offset correction data calculating circuit 30. The offset correction data calculating circuit 30 subtracts the previous offset data OD1 from the latest offset data OD2 to supply the difference therebetween as offset correction data F to an adder 42. The adder 42 adds the first correction data C1 which has been stored in the first correction data holding memory 40 to the offset correction data F calculated from the offset correction data calculating circuit 30 to create a second correction data C2. Thereafter, the second correction data C2 thus created is introduced into the subtractor 24 in which the image data PD has been supplied to one of input terminals of the subtractor 24. Image data PC as the output signal of the subtractor 24 is delivered to the divider 38 as data to be divided. Corrected image data PS is outputted from the output side of the divider 38.

The apparatus to which the image signal correcting method according to the present invention is applied is basically constructed as described above. The operation of the apparatus will now be described with reference to a flowchart for describing the routine procedure shown in FIG. 6.

In a first process, the transparent reference original is first set as the original 10 and the ND filter 18 is moved into the optical path. Thus, the light quantity of the exposure Y (see FIG. 5) is supplied to the line sensor 16. At the time of its supply, a read signal LS outputted from the effective pixels 16a of the line sensor 16 is converted into the image data PD through the A/D converter 20 so as to be supplied to the first correction data calculating circuit 26. Then, the first correction data calculating circuit 26 calculates the difference between an output value, at the exposure Y, outputted from all the effective pixels 16a of the line sensor 16 and the reference value at the ideal output characteristic R (see FIG. 5). Data about the difference therebetween thus calculated is held in the first correction data holding memory 40 as the first correction data C1.

On the other hand, a read signal LS from the black reference pixel 16b in the first process is stored as initial offset data OD at the memory address M2 of the offset data holding memory 28, where it is held as the latest offset data OD2 (the above procedure belongs to the first process).

Then, in a second process, the transparent reference original is reset to the original 10 on which the image is borne in practice. Thereafter, the ND filter 18 is withdrawn from the optical path to the outside and the original 10 is subjected to the light emitted from the light source 12. A read signal LS outputted from the black reference pixel 16b of the line sensor 16 at that time is converted into offset data OD by the A/D converter 20. Then, the offset data OD thus converted is stored as the latest offset data OD2 at the memory address M2 of the offset data holding memory 28. Incidentally, the initial offset data OD, which has been stored at the memory address M2, is shifted to the memory address M1 so as to be held as the previous offset data OD1 thereat. Thus, when new offset data OD is introduced into the offset data holding memory 28, it is stored at the memory address M2 as the latest offset data OD2. The latest offset data OD2, which has already been stored at the memory address M2 before the new offset data OD is introduced into the offset data holding memory 28, is shifted to the memory address M1 as the previous offset data OD1. At this time, the previous offset data OD1, which has already been stored at the memory address M1, is brought into a null state. Incidentally, this previous offset data OD1 may be stored at another memory address as history data without being erased.

Then, the offset correction data calculating circuit 30 determines offset correction data F in a third process. The offset correction data F thus determined corresponds to a value obtained by subtracting the offset data OD1 stored at the memory address M1 from the latest offset data OD2 stored at the memory address M2 of the offset data holding memory 28.

Image data PD corresponding to a read signal LS outputted from the effective pixels 16a is obtained in a fourth process. Then, the image data PD thus obtained is inputted to an input terminal for subtraction of the subtractor 24. Incidentally, the image data PD includes the offset value corresponding to the offset correction data F.

In a fifth process, the adder 42 adds the first correction data C1 relative to the exposure Y to the offset correction data F so as to produce the second correction data C2.

Then, in a sixth process, the subtractor 24 subtracts the second correction data C2 from the image data PD which has already been introduced into one of the input terminals thereof. As a consequence, the image data PC in which the correction relative to the exposure Y and the offset value is made is obtained.

Next, in a seventh process, the divider 38 makes the known shading correction to the image data PC so as to output therefrom image data PS subsequent to the correction processing.

Figure 1:
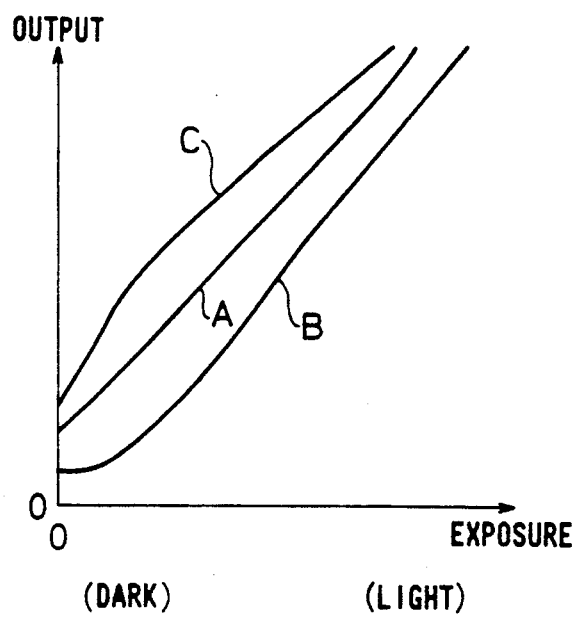
FIGS. 1 through 3 are characteristic diagrams for describing a method of correcting an image signal read by a conventional image sensor.
Figure 2:
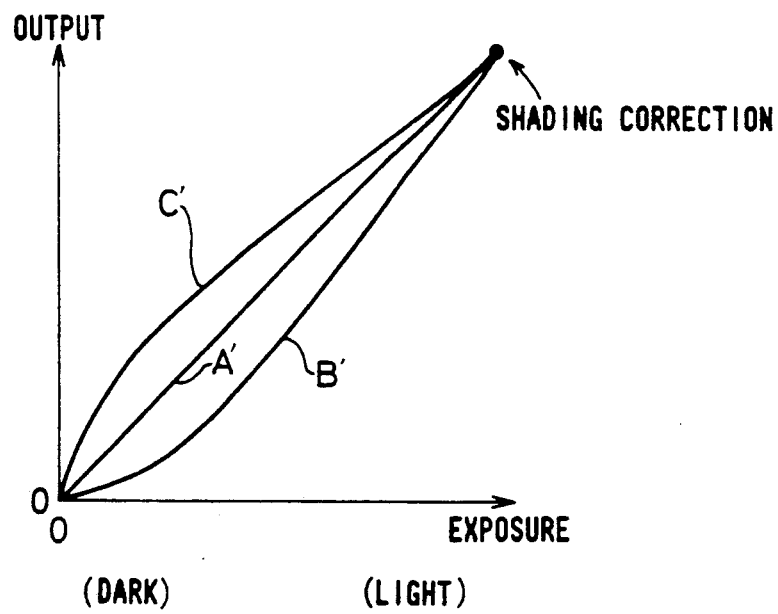
Figure 3:
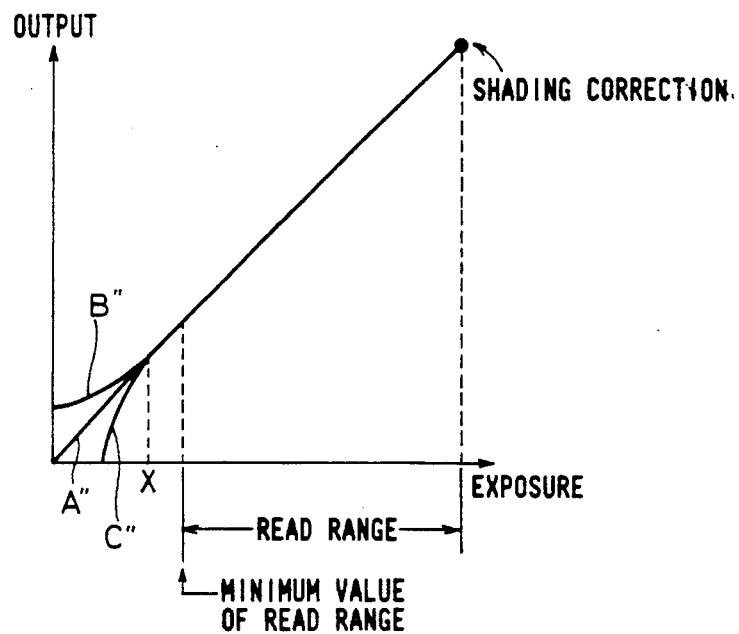
Figure 5:
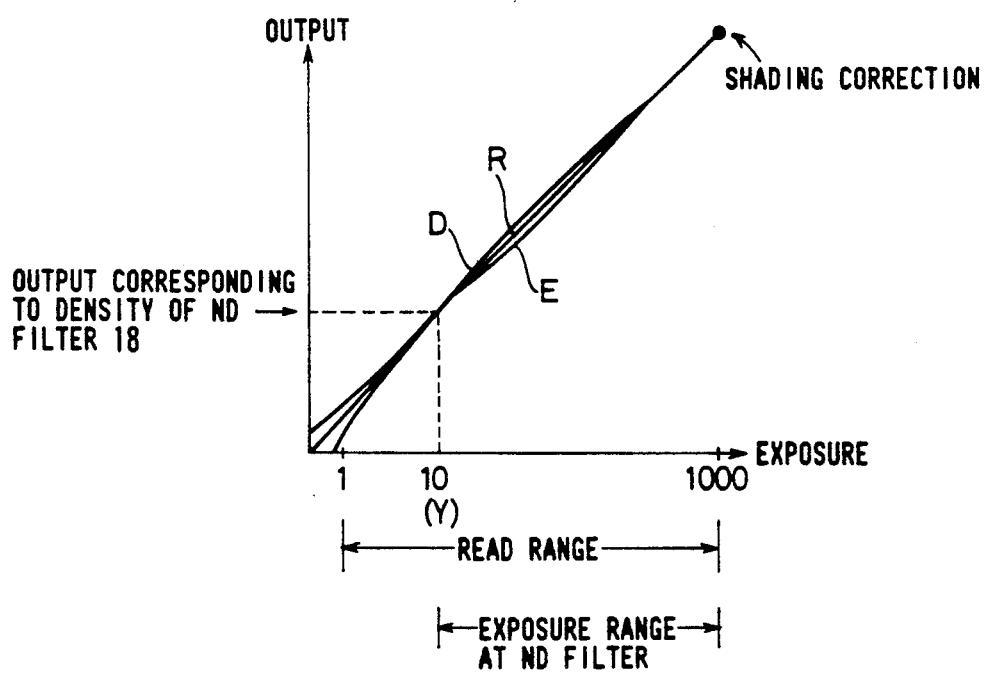
FIG. 5 is a characteristic diagram for describing the operation of the apparatus shown in FIG. 4.

As is apparent from the above-described embodiment, the photoelectric output characteristics of the image signal processing apparatus shown in FIG. 4 are so controlled that the respective image data PD outputted from the effective pixels 16a are converged at the point of the exposure Y as represented by characteristics D and E in FIG. 5. Namely, if the density range to be required is represented by 0 to 3, the exposure range to be required would be 1 to 1000. In addition, the photoelectric conversion characteristics of all the effective pixels 16a are converged at the exposure Y. Accordingly, there are produced slight variations in respective photoelectric conversion characteristics at points exceeding the exposure Y as compared with conventional characteristics shown in FIG. 3. However, the variations in the photoelectric conversion characteristics at an easy-to-perceive lower exposure region are reduced as compared with those at the same region shown in FIG. 3. Therefore, stripe-like exposure unevenness in an outputted image is not visible to the eye, thus making it possible to widen the read range.

Figure 7:
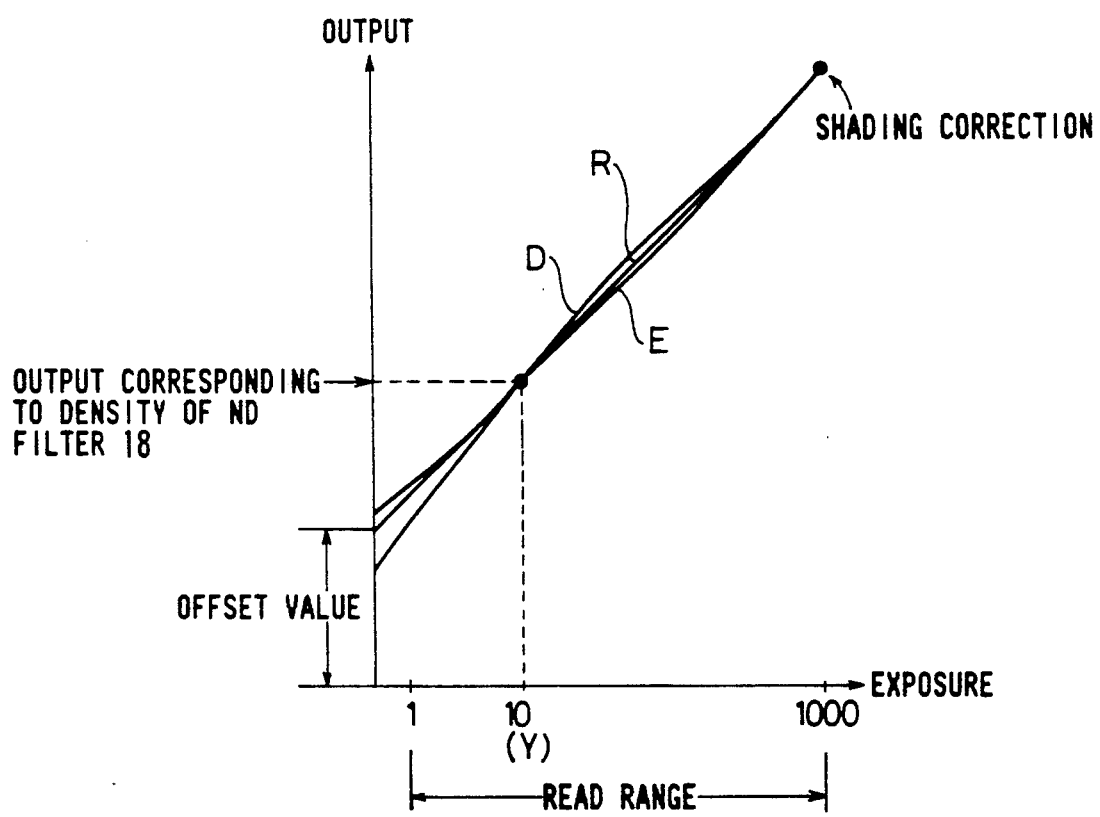
FIG. 7 is a characteristic diagram for describing the operation for carrying out offset correction in the apparatus illustrated in FIG. 4.

When the first offset data holding memory 28 and the offset correction data calculating circuit 30 are not included as components in the image signal processing apparatus, the offset value outputted from the effective pixels 16a of the line sensor 16 is varied at the time of a change in the ambient temperature of the image signal processing apparatus, i.e., at the time of a change in the ambient temperature of the line sensor 16. Therefore, the characteristics of the exposure v.s. the output value are represented stepwise as shown in FIG. 7. However, it will easily be understood that the characteristics free of step-wise difference can be made again as shown in FIG. 5 by repeatedly performing the second and third processes under the arrangement of the present embodiment. Thus, if the second and third processes are always carried out during a period in which a predetermined period of time elapses immediately after the power supply of the image signal processing apparatus is turned on and the second and third processes are frequently performed for each predetermined period of time after the predetermined period of time has elapsed, for example, image data PD, in which the offset has been corrected efficiently, can be obtained.

Incidentally, in the above-described embodiment, the original 10 is used as an original through which light is to be transmitted and the transmitted light is read. However, the original 10 may be used as a reflective original. In addition, the above-described embodiment has shown and described the line sensor as the image sensor. However, the same method as described above may be applied even to an area sensor. The offset data may be set as the average value of offset data OD relative to a plurality of black reference pixels 16b.

According to the image signal correcting method of the present invention, as has been described above, the variations in the characteristics of the image sensor at the low exposure region are corrected within the exposure range required to read the image. It is therefore possible to efficiently correct variations in the output values from the pixels of the image sensor at the exposure range (read range) required to read the image. Since the offset signal is obtained from the black reference pixel of the image sensor and the read image signal is corrected by means of the offset signal thus obtained, the offset value of the image sensor, which is caused by a change in temperature or the like, can be corrected. It is therefore feasible to widen an effective read range and to prevent occurrence of the stripe-like density and the step-wise density unevenness (in the sub-scanning direction) at the time that the image is read by the line sensor.

Having now fully described the invention, it will be apparent to those skilled in the art that many changes and modifications can be made without departing from the spirit or scope of the invention as set forth herein.

What is claimed is:

1. A method of correcting an image signal which is suitable for use in reading an image by an image sensor having a black reference pixel and effective pixels, said method comprising the steps of:

detecting a first output signal generated by said effective pixels of said image sensor when a quantity of light at a specified exposure level is applied from a light source to said image sensor via a reference original;

converting said first output signal to a digital signal to obtain a first image data signal;

supplying said first image data signal to a first correction data calculating circuit;

determining first correction data in said first correction data calculating circuit based upon the difference between said first image data signal and reference data corresponding to an ideal characteristic at said specified exposure level, said ideal characteristic being such that outputs detected from all said effective pixels of said image sensor are identical to each other at said specified exposure level;

detecting a second output signal generated by said black reference pixel of said image sensor when said quantity of light at said specified exposure level is applied from said light source to said image sensor via said reference original;

converting said second output signal to a digital signal to obtain a first offset data signal;

replacing said reference original with an image carrying original film;

detecting a third output signal generated by said black reference pixel of said image sensor when said quantity of light at said specified exposure level is applied to said image sensor via said original film;

converting said third output signal to a digital signal to obtain a second offset data signal;

supplying said first offset data signal and said second offset data signal to an offset correction data calculating circuit;

determining an offset correction data in said offset correction data calculating circuit from the difference between said first offset data signal and said second offset data signal;

adding said first correction data to said offset correction data to obtain a second correction data;

detecting a fourth output signal generated by said effective pixels of said image sensor when said quantity of light at said specified exposure level is applied from said light source to said image sensor via said original film;

converting said fourth output signal to a digital signal to obtain a second image data signal; and subtracting said second correction data from said second image data signal to obtain corrected image data signal.

2. A method according to claim 1, further comprising the step of providing known shading correction data in a shading correction data holding memory; and applying said shading correction data to said corrected image data signal resulting from said subtracting of said second correction data from said second image data signal.

3. A method according to claim 1, wherein said specified exposure level of said quantity of light lies within a range of 1 through 40.

* * * * *